United States Patent Office 3,391,576
Patented July 9, 1968

3,391,576
THERMOMETRIC DEVICE FOR ROTATING STRUCTURES
Katsumi Takami and Kyo Suda, Tokyo-to, Japan, assignors to Kabushiki Kaisha Hitachi Seisakusho, Tokyo-to, Japan, a joint-stock company of Japan
Filed Mar. 3, 1966, Ser. No. 531,536
Claims priority, application Japan, Mar. 13, 1965, 40/14,469
2 Claims. (Cl. 73—351)

ABSTRACT OF THE DISCLOSURE

An LC tank circuit, which is comprised of a coil with low temperature dependency and a capacitor with high temperature dependency, is secured to a rotating structure whose temperature is to be measured, the circuit being electromagnetically coupled with an LC tank circuit of an LC type oscillator, a frequency detector being provided for detecting the change in the oscillation frequency of the oscillator which varies with changes in the temperature at a measuring point on the rotating structure.

---

This invention relates to techniques in thermometry and more particularly to a new thermometric device for detecting or measuring the temperature of a rotating structure without mechanical contact between the rotating structure and the stationary parts of the thermometric device.

In the case where a machine such as, for example, a generator, motor, or an ultracentrifuge is to be protected against overheating or is to be operated while the maximum temperature permitted by the efficiency is maintained, it is necessary to detect the temperature of the rotating structure (rotor) of the machine and to cause an appropriate controller to operate in response to a measuring signal indicating the temperature so detected.

In such a case, it is desirable that the detection or measurement of the temperature of the rotating structure be carried out without mechanical contact between the stationary parts of the measuring means and the rotating structure. It is also desirable that the parts of the sensing means installed in the rotating structure be few in number and, moreover, be mechanically strong.

It is an object of the present invention to provide a thermometric device for rotary machine parts which fulfills the above described requirements.

Another object of the invention is to provide a thermometric device of the instant type which has a very simple construction and operation.

Still another object of the invention is to provide a thermometric device capable of measuring the temperature of a rotating structure continuously and automatically.

A further object of the invention is to provide a thermometric device of the instant type of high measurement accuracy.

According to the present invention, there is provided a thermometric device for measuring the temperature of a rotating structure comprising a tank circuit installed in a part of the rotating structure and having a capacitor whose capacitance varies greatly with temperature and a moving inductance element of very low temperature coefficient. A stationary oscillator having a stationary inductance element is coupled electromagnetically to the moving inductance element without mechanical contact therebetween, and means is provided to measure temperature variation in the rotating structure as a function of variation in the oscillation frequency of the oscillator.

The nature, principle, and details of the invention will be more clearly apparent from the following detailed description when read in conjunction with the accompanying drawings in which like parts are designated by like reference numerals, and in which.

Figure 3:
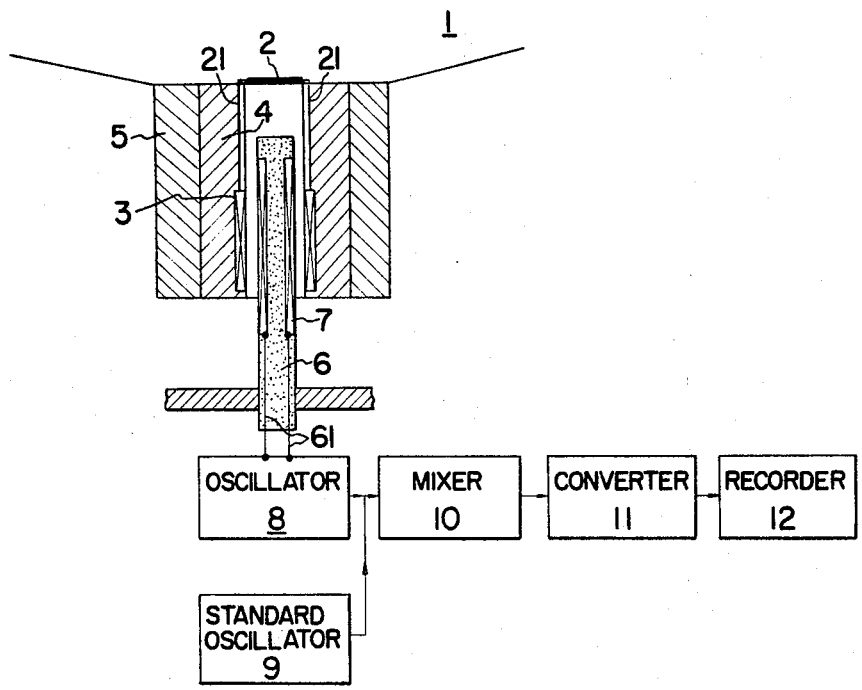
Figure 4A:
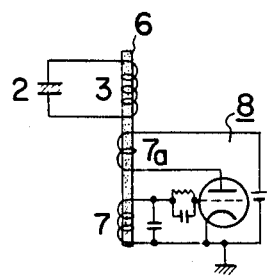
Figure 4B:
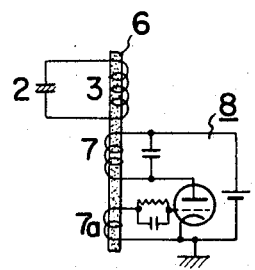
Figure 5:
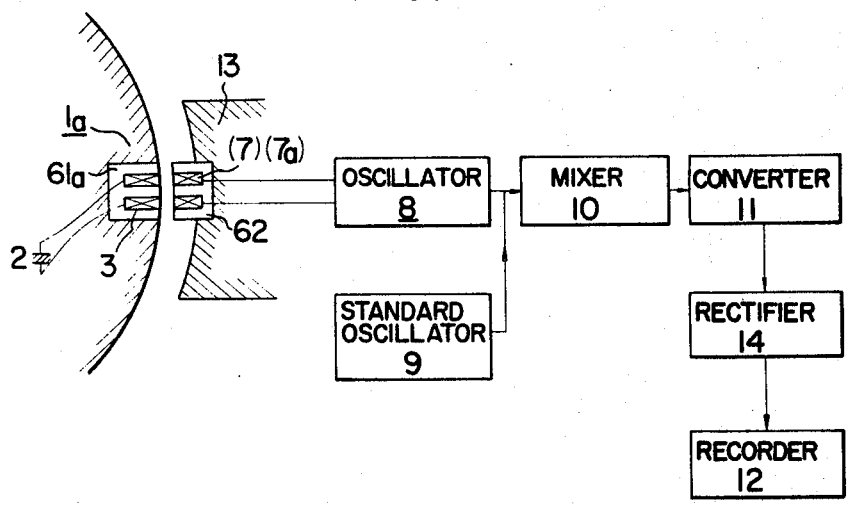

FIGS. 3 and 5 are respectively combinations of sectional views and block diagrams respectively showing embodiments of the invention; and FIGS. 4(a) and 4(b) are simplified circuit diagrams showing examples of oscillators suitable for use in the devices shown in FIGS. 3 and 5.

Figure 1:
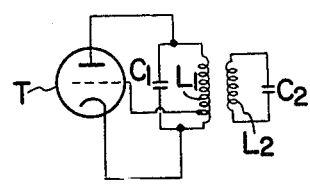
FIG. 1 is a circuit diagram of an oscillator for purposes of giving an explanation of the principle of the present invention.

Referring to FIG. 1 indicating the fundamental principle of the present invention, the oscillator shown therein has a vacuum tube (valve) T with a first tank circuit consisting of coil $L_1$ and a capacitor $C_1$ inserted between the plate and cathode of the vacuum tube T, whose grid is connected to an intermediate point of the coil $L_1$. This circuit constitutes a known oscillator, whose oscillation frequency is determined by the resonant frequency.

$$f_1\left(=\frac{1}{2\pi\sqrt{L_1C_1}}\right)$$

of the tank circuit.

When the coil $L_2$ of a second tank circuit consisting of the coil $L_2$ and a capacitor $C_2$ is electromagnetically coupled to the coil $L_1$ of the oscillator of the above described character, the oscillation frequency of this oscillator acquires a hysteresis characteristic with respect to the resonant frequency of the second tank circuit. This characteristic is indicated in FIG. 2, in which the abscissa represents the resonant frequency $$f_2\left(=\frac{1}{2\pi\sqrt{L_2C_2}}\right)$$

of the second tank circuit, and the ordinate represents the oscillation frequency $f_0$ of the oscillator.

Figure 2:
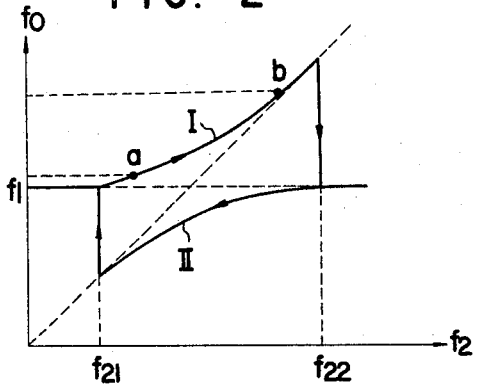
FIG. 2 is a graphical representation for a description of the so-called Ziehen effect of an oscillator.

As is observable from FIG. 2, as the resonant frequency $f_2$ is progressively increased, the oscillation frequency $f_0$ first assumes the value of the resonant frequency $f_1$ of the first tank circuit and then increases according to a curve I. Then, when the resonant frequency $f_2$ reaches a specified value $f_{22}$, the oscillation frequency $f_0$ again assumes a value in the vicinity of $f_1$. As the resonant frequency $f_2$ is decreased from this point, the oscillation frequency $f_0$ this time decreases according to a curve II. Furthermore, if the resonant frequency $f_2$ is decreased prior to its reaching the value $f_{22}$, the oscillation frequency $f_0$ will decrease along the cure I.

This phenomenon, which is known as the "Ziehen Erscheinung" or pulling effect, is thought to occur because of the equivalent change in the reactance component of the first tank circuit due to the second tank circuit.

The present invention is based on our observation that the oscilation frequency of the above described oscillator is caused to vary by a tank circuit which is not connected directly to the oscillator as in the above described case and contemplates utilization of this phenomenon to measure the temperature of a rotating structure.

One embodiment of the present invention as applied to the rotor of an ultracentrifuge is indicated in FIG. 3. At the center of the bottom of the rotor 1 of the ultracentrifuge, there is embedded a capacitor 2, for example, a ceramic capacitor, whose capacitance varies considerably with temperature. Concentrically around the capacitor 2 there is embedded in the bottom of the rotor 1 a bobbin 4 made of an electrically insulating material provided at its lower interior surface with a concentric coil 3 of a very low temperature coefficient. The bobbin 4 is secured to the rotor 1 by a metal cylinder 5 interposed therebetween.

The capacitor 2 and the coil 3 are connected by conductor wires 21, thereby constituting a tank circuit. A powder core 6 about which an oscillator coil 7 is wound is disposed centrally within the hollow interior of the bobbin 4. The coils 3 and 7 are wound coaxially and are electromagnetically coupled. The terminals of the coil 7 are connected via lead wires 61 to an oscillator 8, the coil 7 constituting a part of the oscillator 8.

Specific examples of composition and arrangement of the oscillator 8 are shown in FIGS. 4(a) and 4(b). FIG. 4(a) shows a grid-resonant type oscillator having a resonant circuit in the grid circuit of a vacuum tube (valve), while FIG. 4(b) shows a plate-resonant type oscillator having a resonant circuit in the plate circuit. Reference numeral 7a designates a positive feedback coil also wound about the powder core 6. The remaining reference numerals conform to their designations in FIG. 1.

While vacuum tubes are used in the oscillators illustrated in FIGS. 4(a) and 4(b), transistors may, of course, be used instead. Furthermore, another oscillator of LC type as, for example, a Hartley oscillator, a Colpitts oscillator, or a Meissner oscillator, may be used as the oscillator 8.

The output of the oscillator 8 is applied, together with the output of a standard oscillator 9 of high frequency stability such as a crystal oscillator, to a mixer 10. This mixer 10 generates a beat signal of the frequency signals of the oscillators 8 and 9. The resulting frequency signal is converted into a voltage corresponding thereto by a frequency-voltage converter 11, which voltage is recorded by a recorder 12.

The thermometric device of the above described composition and arrangement according to the invention operates in the following manner.

When, in the case where a ceramic capacitor is used for the capacitor 2, and the rotor 1 is at room temperature, the capacitor 2 has a relatively high capacitance value. Consequently, the resonant frequency $f_2$ of the tank circuit mounted on the rotor is relatively low, and the oscillation frequency $f_0$ of the oscillator 8, accordingly, assumes a value, for example, that of point $a$ of curve I in FIG. 2.

Then, when the temperature of the rotor 1 rises, the capacitance of the capacitor 2 decreases, and, as a consequence, the resonant frequency $f_2$ of the second tank circuit increases. Accordingly, the oscillation frequency $f_0$ assumes the value at point $b$ of the curve I. From this result, it is apparent that it is possible to detect the variation of temperature of the rotor as a variation of the oscillation frequency $f_0$ of the oscillator 8. As described above, this frequency signal is compared with a standard frequency signal, after which the difference therebetween is converted into a voltage. When necessary however, the frequency signal from the oscillator may be directly measured.

While the foregoing description relates to the case wherein use is made of the characteristic indicated by curve I in FIG. 2, it will be apparent that the characteristic indicated by curve II may be also utilized. Use of the characteristic of curve I affords the advantage of good linearity of the relationship between the capacitance C of the capacitor 2 and the oscillation frequency $f_0$, while the use of the characteristic of curve II affords the advantage of reduction to some extent of the effect of stray capacitance.

While the range of temperature which can be measured by the device of this invention is limited to a range such that the variation of the aforementioned resonant frequency $f_2$ of the second tank circuit satisfies the relationship $f_{21} < f_2 < f_{22}$ (FIG. 2), this measurable temperature range can be changed somewhat by changing the coupling coefficient of the coils 3 and 7.

Furthermore, in the device of this invention, an undesirable variation in the coupling coefficient has a direct influence on the oscillation frequency $f_0$ whereby there is the possibility of measurement such as would result if the resonant frequency $f_1$ of the first tank circuit were to change. However, this influence can be diminished to a very small magnitude by making the axial length of the coil 7 as shown in FIG. 3 equal to approximately two to three times that of the coil 3 and thereby diminishing the variation in the coupling coefficient due to axial movement of the rotor 1.

While the foregoing description relates to an embodiment of the invention as applied to an ultracentrifuge, the device of the invention can be readily adapted for use in rotating structures in general as illustrated by the embodiment of the invention shown in FIG. 5. In this case, the coils 3 and 7 to be coupled, instead of being disposed in mutually concentric positions, are so constructed and arranged that every time the rotating structure $1a$ rotates through one revolution, the coil 3 is brought into a position where it confronts the coil 7.

More specifically, in a recess at one part of the peripheral surface of the rotating structure $1a$, there is embedded a core $61a$ around which a coil 3 is wound. A stationary holder 13 is fixedly supported with a suitable gap between its forward surface and the above mentioned peripheral surface of the rotating structure $1a$ and holds a core 62 embedded in one part of said forward surface thereof. Around this core 62, there are wound coils 7 and $7a$ which constitute a part of an oscillator 8, the coils 3 and 7 being in mutually confronting disposition at one point in the revolution of the rotating structure $1a$.

The remaining components of the device shown in FIG. 5 are similar to those in the device shown in FIG. 3 except for the addition of a rectifier 14 for rectifying voltages above a specific level in the output of the frequency-voltage converter 11.

By the above described construction and arrangement, every time the coils 3 and 7 are coupled, it is possible to obtain an oscillation frequency signal $f_0$ affected by the resonant frequency $f_1$ of a first tank circuit because of the Ziehen effect only during the period in which the two coils are coupled. Since this signal is transmitted intermittently, and the output of the frequency-voltage converter is also pulsed, it is necesesary to pass this output through the recifier 14 for rectifying voltages above a specific level and then to apply the resulting output to the recorder 12.

In this case, since it is desirable that an oscillation frequency $f_1$ be produced when the tank circuits for temperature measurement are not coupled and that a signal of a frequency which is at least higher than $f_1$ be generated when the tank circuits are coupled, it is preferable to ultilize the part of curve I as shown in FIG. 2.

In the case of inductive coupling of coils wound around respective cores as in the above described example, an outside D-C magnetic field causes a variation in the permeability of the cores which give rise to errors in measurement. Accordingly, particularly in machines such as generators in which the environmental magnetic field varies, it is necessary to select with ample care the mounting positions of the core.

As will be apparent from the foregoing description, the present invention provides a thermometric device wherein the resonant frequency of a tank circuit for temperature measurement is caused to vary in response to variation in the temperature of a rotating structure, and the oscillation frequency of an oscillator is caused to vary in accordance with the resulting variation of said resonant frequency. Accordingly, the thermometric device has the advantages of very simple construction and operation and the capability of continuously and automatically measuring the temperature of the rotating structure.

Further advantages of the device of the invention are that resulting oscillation frequency signals can be directly used for digital indication and that the measurement accuracy is high.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What we claim is:

1. A device for measuring the temperature at a location in a rotating structure, said device comprising an LC type non-adjustable oscillator including a primary tank circuit comprising a coil and a capacitor; an auxiliary tank circuit secured to said rotating structure and comprising a coil which has a very low temperature coefficient and a temperature sensitive capacitor provided at said location point having a capacitance value which varies greatly in response to temperature changes at said location, said coil of the auxiliary tank circuit and the coil of the primary tank circuit being electromagnetically coupled such that the oscillation frequency of said oscillator is determined by the auxiliary and primary tank circuits and is varied by changes in the resonant frequency of the auxiliary tank circuit; and means for detecting the variation of the oscillation frequency of said oscillator, whereby temperature changes at said location are indicated.

2. A device according to claim 1 in which said oscillation frequency detecting means comprises: means for producing a constant frequency signal; means for comparing the oscillation frequency signal of the oscillator with the constant frequency signal to generate a beat signal therebetween; and means for monotonically converting the beat frequency into a voltage signal so that the frequency change of the oscillator is detected as changes in the voltage signal.

References Cited

UNITED STATES PATENTS

| | | | |
|---|---|---|---|
| 2,575,922 | 11/1951 | Langenwalter | 73—351 |
| 3,174,341 | 3/1965 | Sudo et al. | 73—351 |
| 3,268,880 | 8/1966 | Miller | 73—351 |
| 3,303,701 | 2/1967 | Matsuura | 73—351 |
| 3,338,100 | 8/1967 | Takami | 73—351 |

DAVID SCHONBERG, *Primary Examiner.*

LOUIS R. PRINCE, *Examiner.*

NEIL B. SIEGEL, *Assistant Examiner.*